United States Patent [19]

Baker

[11] 3,893,087

[45] July 1, 1975

[54] RANDOM ACCESS MEMORY WITH SHARED COLUMN CONDUCTORS

[75] Inventor: Lamar T. Baker, West Islip, N.Y.

[73] Assignee: General Instrument Corporation, Clifton, N.J.

[22] Filed: Feb. 8, 1974

[21] Appl. No.: 440,699

[52] U.S. Cl. .......................... 340/173 R; 340/172.5

[51] Int. Cl. .......................... G11c 11/40

[58] Field of Search ....... 340/173 R, 173 DR, 172.5

[56] References Cited

UNITED STATES PATENTS 3,800,299 2/1973 Panther .......................... 340/173 R

*Primary Examiner*—Terrell W. Fears

[57] ABSTRACT

A random access memory includes a plurality of memory cells each having a data storage portion. The cells are arranged in a matrix array comprising rows and columns. A first control line extends between adjacent columns. Means are provided for conditionally connecting the first control line to the data storage portion of each of the cells in the two adjacent columns. Second and third control lines are provided extending along each row of the cells. At least one of the second and third control lines is connected to the conditional connecting means associated with each cell. The second and third control lines are effective, when respectively actuated, to actuate the conditional connecting means to selectively connect the data storage portion of one or the other of the cells in that row adjacent the first control line to the first control line. In this way, a single column line is shared by adjacent columns of memory cells thereby permitting considerable latitude in shaping the length-to-width ratio of the memory cells, in designing the layout of the memory and therefore in determining the shape of the chip upon which the memory is formed.

22 Claims, 4 Drawing Figures

RANDOM ACCESS MEMORY WITH SHARED COLUMN CONDUCTORS

The present invention relates to random access memories and, more particularly, to a random access memory wherein a tradeoff may be made of the number of row conductors against the number of column conductors such that the density of cells per unit area of chip may be increased and the shape of the chip varied to conform to the shape of a package pedestal or cavity.

A random access memory includes a plurality of field effect transistors and other circuit elements which are fabricated onto a semiconductor chip to form a number of memory cells. The memory cells are normally arranged in a matrix array consisting of rows and columns of cells. (As a matter of convention, the term "row" relates to horizontal arrangements and the term "column" relates to vertical arrangements, but it will be understood that those terms as here used may be interchanged or otherwise applied, the terms being here used in their most generic senses.) Address circuitry is utilized to select a particular memory cell in the array and data input and output connections are provided so that data can be read from or written into the selected memory cell. Signals from the addressing circuitry and data to and from the individual memory cells are carried on conductors or lines which are situated along each of the rows and down each of the columns of the memory.

In one now standard memory configuration, four conductors or lines are utilized to provide the interconnections between the memory cells and address circuitry, two situated along each row of the memory and two situated along each column of the memory. In this configuration, each of the memory cells has four external connections, one to each of the conductors. One of the row conductors carried the read signal to the cells and the other row conductor carried the write signal to the cells. One of the column conductors carried the data input to the cells, and another column conductor carried the data output from the cells. In this configuration if there are $m$ rows and n columns, the total number of conductors equals $2m + 2n$.

In other known memory configurations each memory cell is connected to one row conductor and one column conductor, with each row conductor functioning for a different row of memory cells and each column conductor functioning for a different column of memory cells. In this configuration if there are $m$ rows and $n$ columns, the total number of conductors equals $m + n$. In both cases the need for separate row or column conductors for each of the rows and columns respectively places a great constraint on modifying the width-to-length ratio of the memory cells. The shape of the individual memory cells is extremely important when the chip upon which the memory is formed must conform to the shape of a package pedestal or cavity. Because of the inflexibility of this design feature, wasted space may be present in the chip layout which causes a reduction in the capacity of the memory.

In the case of dynamic random access memories (a memory in which each of the memory cells must be refreshed so that the information stored thereon is retained), a refresh amplifier must be provided for each column of memory cells. Since each of the refresh amplifiers in a dynamic random access memory is normally situated in alignment with the column of memory cells to which it is connected, a severe limitation is placed on the width of the refresh amplifiers — they must be no wider than the width of a single memory cell, or else space will be wasted between columns. Thus, in the case of the dynamic random access memory, not only is the width-to-length ratio of the memory cell restricted but also the width of the refresh amplifier for each column is determined by the restriction imposed on the shape of the cells.

It is, therefore, a prime object of the present invention to devise a random access memory which utilizes a three conductor control system to achieve maximum capacity but which permits greater latitude in shaping the width-to-length ratio of the memory cell.

It is another object of the present invention to provide a random access memory having a three conductor control system which, when used as a dynamic memory, permits each refresh amplifier to have a width up to twice the width of each of the memory cells without any waste of space.

It is a further object of the present invention to provide a random access memory having a three conductor control system which permits a tradeoff of the number of row conductors against the number of column conductors, thus providing extended latitude in shaping the width-to-length ratio of the individual memory cells, as well as in the design of the chip layout.

It is still another object of the present invention to provide a random access memory having a three conductor control system wherein adjacent columns of memory cells share a common column conductor.

It is yet another object of the present invention to provide a memory matrix of $m$ rows and $n$ columns in which the total number of conductors equals $2m + n$.

In accordance with the present invention, a random access memory having a plurality of memory cells arranged in a matrix comprising rows and columns is provided. Each of the memory cells has a data storage portion. A first control line is situated between each pair of adjacent columns of memory cells. Means are provided for conditionally connecting the first control line to the data storage portion of each of the memory cells in the columns adjacent thereto. Second and third control lines are situated along each row of memory cells in the matrix. The second and third control lines are effective, when respectively actuated, to actuate the conditional connecting means to selectively connect the data storage portion of one or the other of the adjacent memory cells to the first control line situated therebetween.

Thus, a tradeoff is made of the number of row conductors against the number of column conductors, thereby permitting greater latitude in the shaping of the width-to-length ratio of the individual memory cell while still maintaining maximum memory capacity. Further, when this control system is utilized in a dynamic random access memory, only a single refresh amplifier is necessary for each of the first control lines and therefore for each pair of adjacent columns. This permits the width of the refresh amplifier to be as great as the width of two adjacent columns. Therefore, the refresh amplifier may have twice the width of the refresh amplifiers in conventional systems without wasting space. This factor, in addition to the permitted variations in the width-to-length ratio of the individual memory cells, permits much more efficient utilization of available chip space as well as greater latitude in designing chips which must conform to the shape of a package pedestal or cavity.

To the accomplishment of the above and to such other aspects as may hereinafter appear, the present invention relates to a random access memory with shared column conductors as defined by the appended claims and as described in the specification, taken together with the accompanying drawings wherein like numerals refer to like parts and in which:

Figure 1:
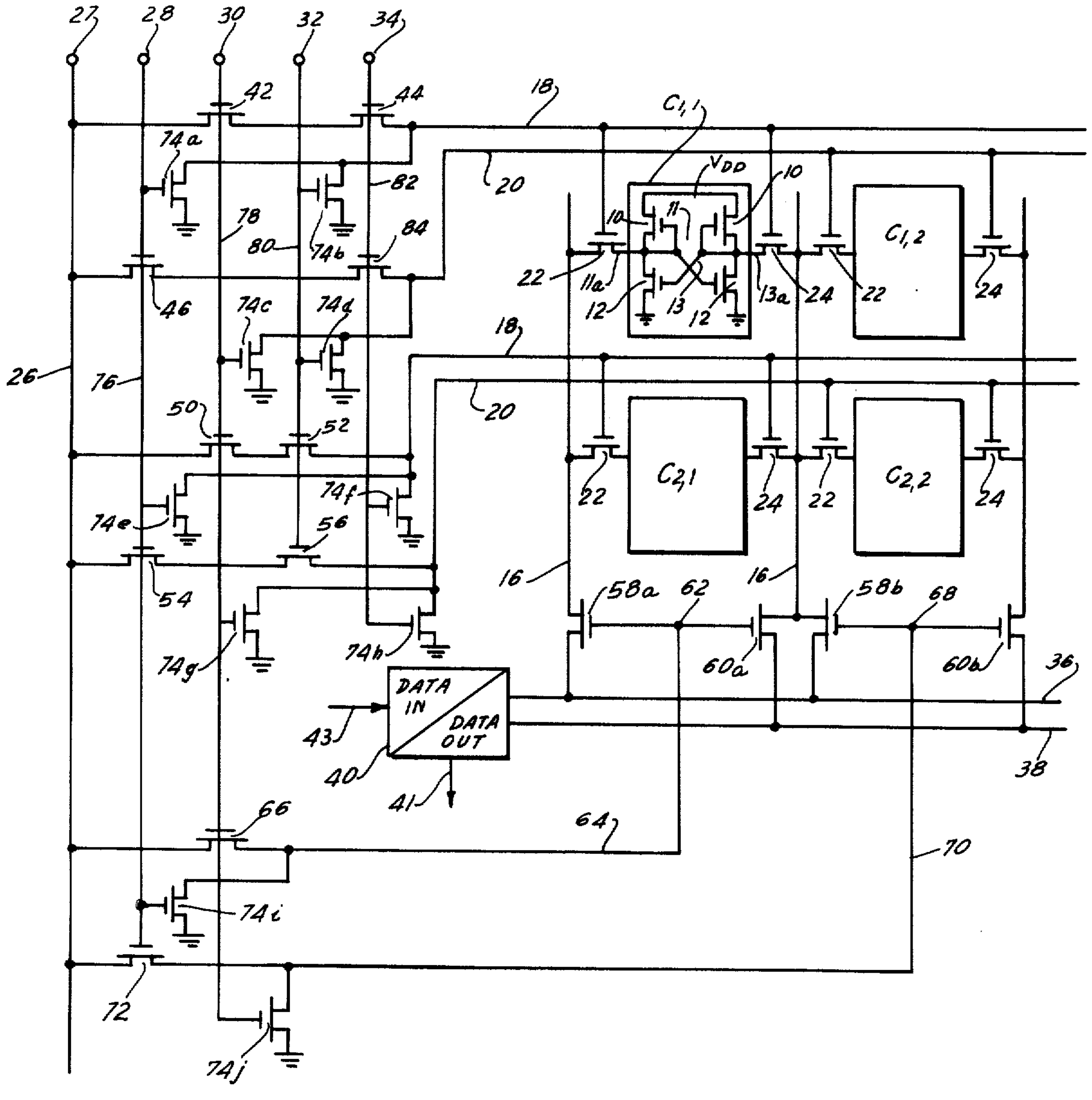
FIG. 1 is a schematic diagram of a static random access memory utilizing the control system of the present invention.

FIG. 1 shows a four cell static random access memory utilizing the control system of the present invention. Each of the cells in the memory (only one of which is shown in detail) is formed of a pair of cross-coupled inverter circuits in a bistable flip-flop arrangement. Each cell is generally designated C with subscripts representing the row and column respectively in which it is situated. Each of the inverter circuits comprises a load device, shown here as field effect transistor 10, and a driver device, shown here as field effect transistor 12. The output circuits of the load device 10 and driver device 12 in each inverter are connected in series between a voltage source $V_{DD}$ and ground. The control terminal of load device 10 of the first inverter is operably connected through a storage node 11 to the control terminal of driver device 12 of the opposite inverter. Likewise, the control terminal of the load device 10 of the second inverter is operably connected through storage node 13 to the control terminal of driver 12 of the first inverter. The data input 11*a* to the cell is connected to storage node 11 and the data output 13*a* of the circuit is connected to storage node 13. The interconnection between the inverter circuits permits only one of these storage nodes 11, 13 to be energized at a given instant. Which of these storage nodes 11, 13 is energized determines whether a logic zero or a logic one state is present on the memory cell.

The control system comprises a plurality of first control lines 16 which are disposed between adjacent columns of memory cells. Each control line 16 is conditionally connected to and shared by each of the memory cells in each of the adjacent columns between which it is situated. Each row of memory cells is provided with a second control line 18 and a third control line 20. The memory cells in odd numbered columns ($C_{x,1}$, $C_{x,3}$, etc.) are connected to control line 18 whereas the memory cells in even numbered columns ($C_{x,2}$, $C_{x,4}$, etc.) are connected to control line 20.

A switching device 22 is provided to conditionally connect the data input 11*a* of each cell in the memory to the column conductor 16 adjacent thereto. Likewise, a switching device 24 is utilized to conditionally connect the data output 13*a* of each memory cell to the column conductor 16 immediately adjacent thereto. Preferably, switching device 22 comprises a field effect transistor having its output circuit operably connected between a column conductor 16 and the data input 11*a* of the memory. The control terminal of device 22 is operably connected to one of the row conductors 18 or 20. Likewise, device 24 preferably comprises a field effect transistor whose output circuit is operably connected between the data output 13*a* of the cell and the column conductor 16 situated on the opposite side of the cell from the column conductor 16 to which device 22 is connected. The control terminal of device 24 is operably connected to the same one of the row conductors 18 or 20 to which the control terminal of device 22 associated with that cell is connected. Which of the row conductors 18 or 20, the control terminals of devices 22 and 24 associated with a particular memory cell are connected to depends upon whether that particular cell is situated in an odd numbered column or in an even numbered column. The cells in odd numbered columns ($C_{x,1}$, $C_{x,3}$, etc.) have the control terminals of the devices 22 and 24 associated therewith connected to row conductors 18. On the other hand, memory cells in even numbered columns ($C_{x,2}$, $C_{x,4}$, etc.) have the control terminals of the devices 22 and 24 associated therewith connected to row conductors 20.

The address circuitry associated with this memory comprises a power line 26 which is operably connected to a voltage source (not shown) through node 27. Four input nodes 28, 30, 32 and 34 are provided to receive the signals which determine which of the memory cells in the memory is to be addressed. In addition, a data input carrier line 36 and a data output carrier line 38 are provided to transfer data between each of the column conductors 16 and data input/output buffer circuitry 40.

The row conductor 18 associated with row 1 of the memory cells C is connected to line 26 through depletion mode transistors 42 and 44. Row conductor 20 of row 1 is connected to conductor 26 through depletion mode transistors 46 and 48. In a similar manner, row conductor 18 of row 2 is operably connected to conductor 26 by means of depletion transistors 50 and 52 and conductor 20 of row 2 is connected to conductor 26 by means of depletion transistors 54 and 56.

A data input carrier line 36 is operably connected to each of the column conductors 16 by means of a different one of the transistors 58. Likewise, data output carrier line 38 is operably connected to column conductor 16 by means of a different one of the transistors 60. The control terminals of transistors 58*a* and 60*a* associated with conductor 16 on either side of the first column of memory devices are connected at node 62. Node 62 is connected to line 26 by means of line 64 through a depletion mode transistor 66. Likewise, the control terminals of devices 58*b* and 60*b* associated with the column conductor 16 on either side of the second column of memory devices are joined at node 68 which, and by means of line 70 and depletion mode transistor 72, are also connected to line 26.

Depletion mode transistors have the characteristic of being normally conductive and are rendered nonconductive only when a biasing voltage of sufficient magnitude and appropriate polarity is impressed thereon. All of the transistors present in the memory unless otherwise designated are enhancement mode transistors which are normally nonconductive and thus necessitate a bias voltage of particular magnitude and polarity to render them conductive. Thus, each of the row conductors 18 and 20 and each of the lines 64 and 70 is normally connected to the voltage source (not shown) through conductor 26.

Nodes 28, 30, 32 and 34 are connected to receive the address signals such that the appropriate cell can be selected for a read or write operation. The signal input at nodes 28 and 30 will be complementary. Likewise, the signal inputs at nodes 32 and 34 will be complementary. The address signals present on nodes 28, 30, 32 and 34 are conducted to the address circuitry by means of lines 76, 78, 80 and 82 respectively. Each of the lines 18, 20 and 64 and 70 is conditionally connected to ground by one or more transistors **74*a* through 74*j*. Line 18 of the first row is conditionally connected to ground by transistor 74*a*, whose control terminal is connected to line 76 and by transistor 74*b*, whose control terminal is connected to line 80. Line 20 of the first row is conditionally connected to ground by transistor 74*c*, whose control terminal is connected to line 78 and by transistor 74*d*, whose control terminal is connected to line 80. Line 18 of the second row is conditionally connected to ground by transistor 74*e*, whose control terminal is connected to line 76 and transistor 74*f*, whose control terminal is connected to line 82. Line 20 of the second row is conditionally connected to ground by means of transistor 74*g*, whose control terminal is connected to line 78 and by transistor 74*h*, whose control terminal is connected to line 82. Line 64 is conditionally connected to ground by means of transistor 74*i*, whose control terminal is connected to line 76 and line 70 is conditionally connected to ground by means of transistor 74*j*, whose control terminal is connected to line 78**.

The appropriate signals on nodes 28, 30, 32 and 34 will serve to select the addressed memory cell. For instance, if the cell $C_{1,1}$ were to be addressed, the address signals could be positive at nodes 30 and 34 and zero at nodes 28 and 32. This combination of signals would apply a positive signal on lines 78 and 82. The positive signal on line 78 would render transistors **74*c*, 74*g* and 74*j* conductive thus grounding control lines 20 of the first row, 20 of the second row and line 70. The positive signal on line 82 would render conductive transistors 74*f* and 74*h* thus grounding line 18 of the second row as well as line 20 of the second row. Therefore, only row conductor 18 and line 64** remain energized. In a similar manner, a particular pattern of address signals may be used to select any one of the cells C in the array.

The voltage present on row line 18 of the first row of cells renders conductive devices 22 and 24 whose control terminals are connected thereto, i.e. those associated with the cell $C_{1,1}$ in the first row and the first column. The voltage level on line 64 is sufficient to render conductive transistors **58*a* and 60*a* whose control terminals are connected thereto through node 62. Thus, the column conductor 16 to the left of the addressed memory cell $C_{1,1}$ is connected to data input line 36 through transistor 58*a* and column conductor 16 to the right of the addressed memory cell is connected to data output line 38 by means of transistor 60*a***.

If data is to be read from the addressed cell, data output carrier line 38 is connected to the data output 41 of the memory by means of buffer 40. Thus, storage node 13 of the addressed memory cell $C_{1,1}$ of the addressed memory cell $C_{1,1}$ is operably connected to memory output 41 by means of output switching device 24 and the righthand column conductor 16 associated with the addressed cell.

On the other hand, if data is to be written into the addressed cell, data input carrier line 36 is connected to the data input 43 of the memory by means of buffer 40 thereby connecting the data input 43 of the memory to the storage node 11 of cell $C_{1,1}$ through switching device 22 and the lefthand column conductor 16. After the read or write cycle has been completed, a new set of addressed signals appears on nodes 28, 30, 32 and 34 thus selecting a different one of the memory cells upon which to perform a read or write function.

Thus, it can be seen that each column conductor 16 situated between adjacent columns of memory cells is shared by each cell in the adjacent columns and acts as both a data output flow line for the memory cells in one of the columns and a data input flow line for the memory cells in the adjacent column.

Figure 2:
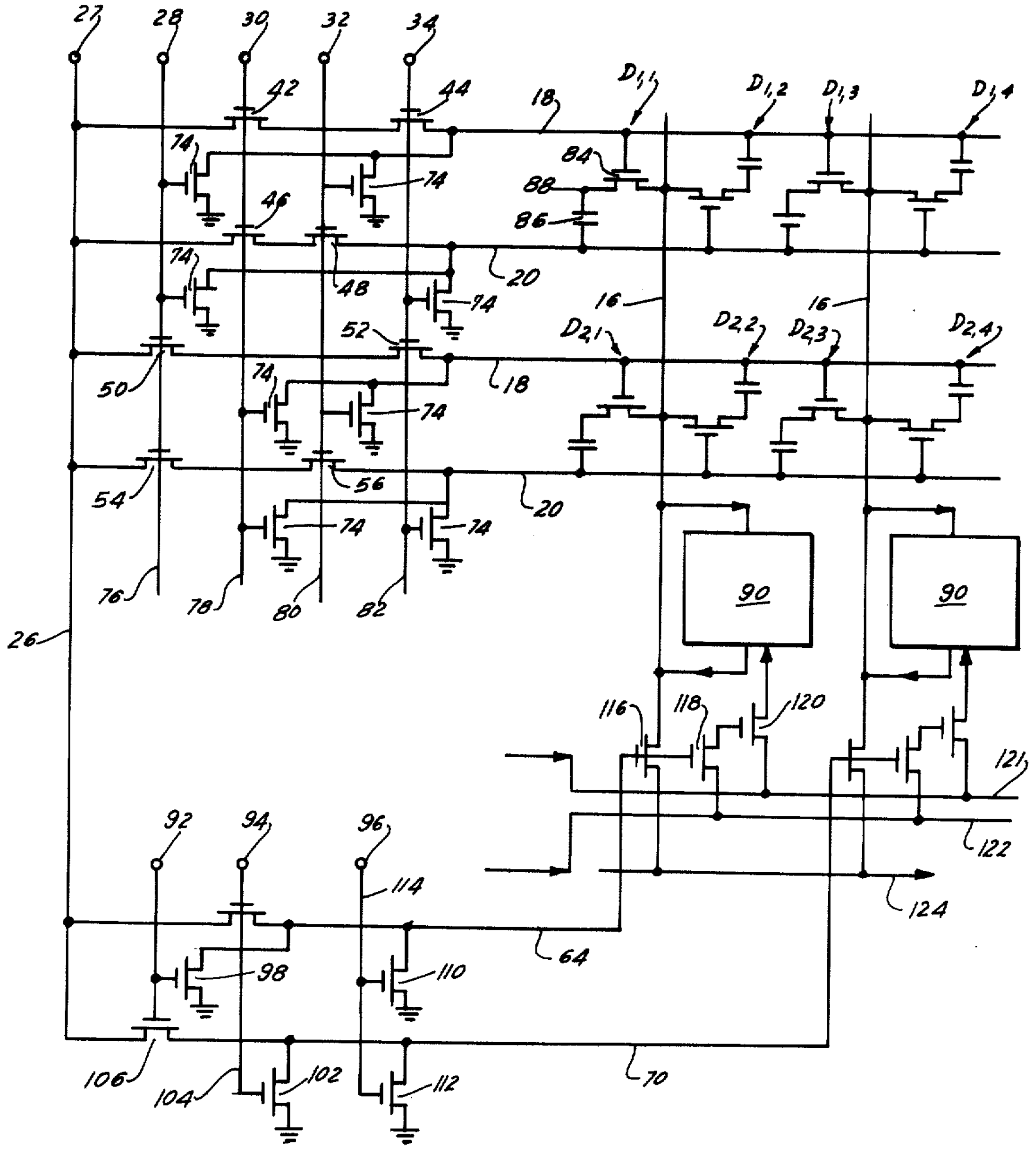
FIG. 2 is a schematic diagram of a dynamic random access memory utilizing the control system of the present invention.

FIG. 2 shows the control system of the present invention utilized in a dynamic random access memory. As seen in this figure, each of the memory cells generally designated $D_{x,y}$ wherein the first subscript designates the row and the second subscript the column in which the cell is situated, comprises a single switching device and a capacitor which is connected to the switching device through a storage node. For instance, the cell $D_{1,1}$ in the first row and the first column comprises a switching device 84 and a capacitor 86 connected together through a storage node 88. Again, each row has a row conductor 18 and a row conductor 20 and each pair of adjacent columns shares a common column conductor 16. In the odd numbered columns, the control terminal of the switching device is operably connected to the row conductor 18 and the capacitor between the storage node and row conductor 20, whereas in the even columns the control terminal of the switching device is operably connected to the row conductor 20 and the capacitor between the storage node and conductor 18.

The row selection circuitry associated with the dynamic memory works in essentially the same manner as described for the static random access memory. For instance, if the memory cell $D_{1,1}$ is addressed, row conductor 18 in row one will be energized, whereas the row conductor 20 in that row will be grounded. This serves to render device 84 conductive, thereby connecting column conductor 16 to storage node 88. The memory cells ($D_{x,2}$, $D_{x,4}$, etc.) in the even numbered columns are precisely the same as the memory cells in the odd numbered columns except they are oriented in a different fashion such that the control terminals of their switching devices are operably connected to row conductors 20 instead of row conductor 18. Thus, if a memory cell in the odd numbered column is to be addressed, the row conductor 18 is energized and row conductor 20 is grounded. When a memory cell in an even column is to be addressed, conductor 20 is energized and conductor 18 is grounded.

Since this is a dynamic memory, a refresh amplifier must be associated with each of the memory cells. A refresh amplifier 90 is operably connected to each of the column conductors 16. The column address circuitry in the dynamic memory is separated from the row address circuitry and has three input nodes 92, 94 and 96. The signals to nodes 92, 94 and 96 determine whether a read, refresh, or write cycle is to occur. The signals at nodes 92 and 94 determine which column is to be addressed. These signals are complementary so that only one column is addressed at a particular instant. If either columns one or two are to be addressed, the signal at node 92 is zero and the signal at 94 is positive. Likewise, if either of columns three and four are to be addressed, the signal at node 94 is zero and the signal at node 92 is positive. Which of the memory cells in the addressed columns is to be selected is determined by the row address circuitry as explained above. Therefore, by means of the row address circuitry and the column address circuitry, a single memory cell is addressed.

A positive signal on node 92 causes transistor 98 to become conductive. Transistor 98 has its control terminal tied to line 100 which is connected to node 92. The output circuit of transistor 98 is operably connected between ground and line 64, thus rendering transistor 98 conductive grounds line 64. On the other hand, if node 94 is energized with a positive signal, this serves to render transistor 102 conductive, thus grounding line 70. Transistor 102 has its control terminal operably connected to line 104 which is connected to node 94. The output circuit of transistor 102 is connected between line 70 and ground. Transistors 106 and 108 are depletion mode transistors which are utilized to connect line 70 and line 64, respectively to line 26 to receive the voltage from the voltage source (not shown) connected to node 27. Transistors 110 and 112 are connected to ground lines 64 and 70 respectively when they are rendered conductive. The control terminals of each of the transistors 110 and 112 are connected to line 114 which in turn is connected to node 96. When node 96 receives a positive signal, each of the lines 64 and 70 is connected to ground by means of transistors 110 and 112, respectively.

In order to perform a refresh operation, the signal at node 96 is positive thus grounding both lines 64 and 70. The signals at nodes 92 and 94 have no affect on this operation. The grounding of lines 64 and 70 serve to disconnect the column conductors 16 from a data output line 124. When the appropriate row is selected by the row address circuitry, the appropriate memory cell is connected to the adjacent column conductor 16 by rendering conductive the switching device therein. This in effect connects the storage node of the selected cell with the appropriate conductor 16. Amplifier 90 senses the logic state of conductor 16 and generates a signal of similar polarity but of greater magnitude back on the appropriate column conductor 16. Since the switching device of the addressed memory is still conductive, this refreshed signal is fed to the storage node of the addressed cell. Thereafter, the switching device is rendered nonconductive and the cell is refreshed. This function must take place continually such that each cell is periodically refreshed.

If, however, the data on the addressed cell was to be read from the memory, the appropriate column address circuitry would enable this function to be accomplished. The signal to node 96 would be zero, and the signals to nodes 92 and 94 would determine which column was selected. If, for instance, it was desired to read out the data on the memory cell $D_{1,1}$, node 94 would receive a positive signal and node 92 a zero. The positive signal on row 94 would serve to render transistor 102 conductive thus grounding line 70. The connection between power line 26 and line 64 serves to keep transistors 116 and 118 conductive. Transistor 116 has its output circuit connected between the column conductor 16 situated between columns one and two on the one hand, and a data output line 124 of the other. Transistor 118 has its output circuit operably connected between the control terminal of a transistor 120 and a command signal line 122. Transistor 120 has its output circuit operably connected between refreshing amplifier 90 and data input line 121. Line 64 will be energized whether a read cycle or a write cycle is to take place. If a read cycle is to take place, transistors 116 and 118 will be rendered conductive but line 122 will have not received a write signal and therefore will be at zero voltage. The zero of state of line 122 will prevent transistor 120 from being conductive thus preventing the refresh amplifier 90 from being connected with data input line 121. However, the conductivity of transistor 116 will connect the appropriate column conductor 16 to data output line 124 thereby permitting the data stored on node 88 to be conducted to the output of the memory.

On the other hand, if a write function is desired, a write signal appears on control line 122 which causes transistor 120 to be conductive, thereby connecting data input line 121 to refresh amplifier 90. The signal representative of the data to be read into the selected memory cell which is present on line 121 is refreshed by amplifier 90 and applied to column conductor 16 which, because transistor 84 is conductive will cause the data signal to be written on storage node 88.

Figure 3A:
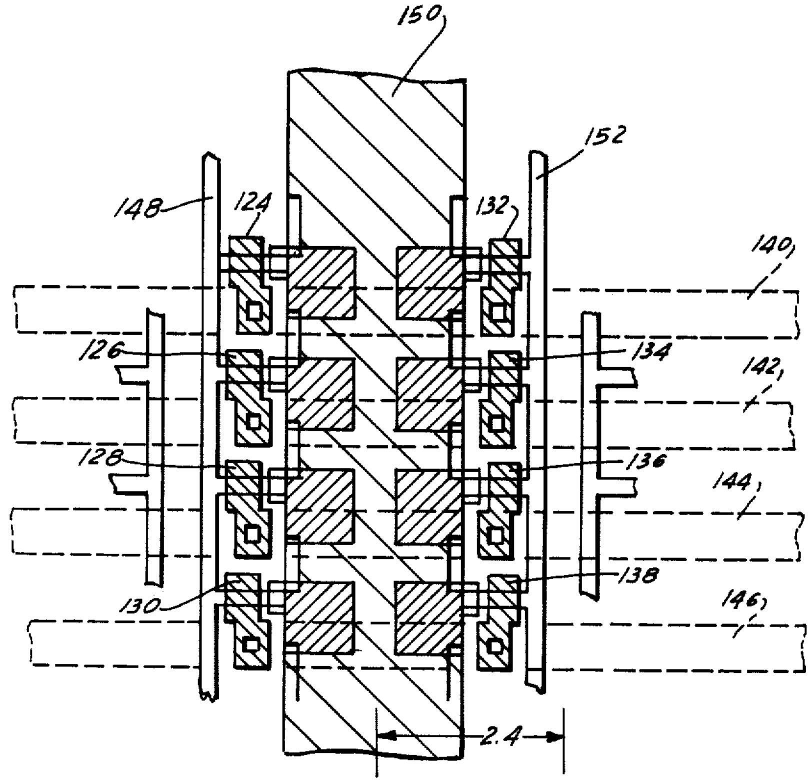
FIGS. 3A and 3B are layout diagrams of a conventional three conductor control system and the three conductor control system of the present invention, respectively.
Figure 3B:
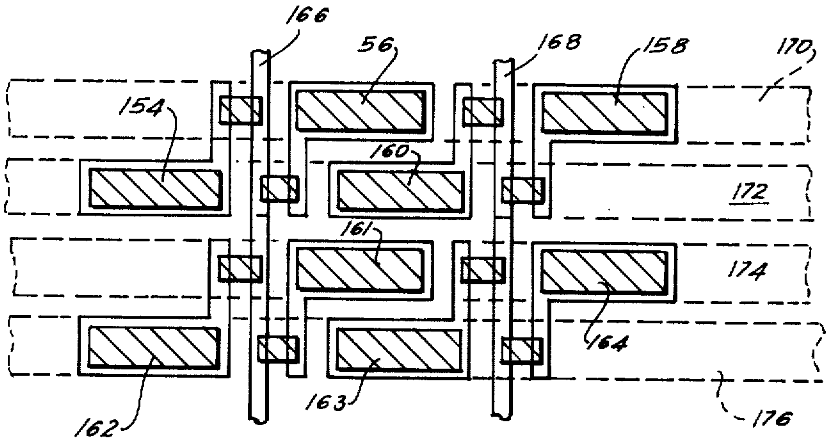

The significant effect the shared column conductor control method has upon the shaping of individual transistors, overall chip shape and layout design can best be appreciated from a comparison of FIGS. 3A and 3B. FIG. 3A shows a portion of the design layout of a 4,096 bit double diffusion silicon gate random access memory made according to the prior art, and FIG. 3B illustrates a similar memory produced according to the present invention. The circuit of FIG. 1 comprises eight transistors 124, 126, 128, 130, 132, 134, 136 and 138. Transistors 124 and 132 forming the first row are connected to a row conductor 140. Transistors 126 and 134 forming the second row are connected to a row conductor 142. Transistors 128 and 136 forming the third row are connected to a row conductor 144 and transistors 130 and 138 forming the fourth row are connected to a row conductor 146. In column one, formed of transistors 124, 126, 128 and 130, each of the transistors is connected between a first column conductor 148 and a second ground plane column conductor 150. In the second column transistors 132, 134, 136 and 138 are connected between column conductor 152 and ground plane column conductor 150.

Since this is a dynamic random access memory, a refresh amplifier must be present for each column. The size and shape of the refresh amplifier is determined by the size and shape of each memory cell. Each column is approximately 2.4 mils wide, thus permitting a refresh amplifier to be a maximum of 2.4 mils wide.

The circuit of FIG. 3B has transistors 154, 156, 158, 160, 161, 162, 163 and 164. The transistors 154 and 162 in the first column and transistors 156 and 161 in the second column share a common column conductor 166. Likewise, transistors 160 and 163 in the third column and transistors 158 and 164 in the fourth column share a common column conductor 168. The transistors 154, 156, 160 and 158 in the first row share two row conductors 170 and 172. Likewise, transistors 162, 161, 163 and 164 in the second row share row conductors 174 and 176 in accordance with the column conductor sharing method of the present invention. Because only a single column conductor is present between adjacent columns, the space on the chip is more efficiently utilized. Further, the width-to-length ratio of the transistors can be varied to achieve more efficient chip layout, as well as to provide flexibility in the shape of the chip itself. Since each column is 1.55 mils wide, and because of the shared column conductor method, only a single refresh amplifier is necessary for each pair of adjacent columns, this configuration permits the refresh amplifier to be 3.1 mils wide as compared to 2.4 mils in the circuit of FIG. 3A. This provides for greater flexiblity in the design of the refresh amplifier.

A preferred embodiment of the present invention has been specifically disclosed herein for purposes of illustration. In particular, the details of addressing and other control circuitry, and the details of the memory cells per se, are but exemplary. It is apparent that many modifications and variations may be made upon the specific structure disclosed herein. It is intended to cover all of these variations and modifications which fall within the scope of this invention as defined by the appended claims.

I claim:

1. A random access memory comprising a pair of adjacent memory cells each having a data storage portion, a first control line, means conditionally connecting said first control line to said data storage portion of each of said cells, and second and third control lines connected to each of said connecting means, said second and third control lines being effective when respectively actuated to cause said connecting means to selectively connect said data storage portion of one or the other of said cells to said first control line.

2. The memory of claim 1 wherein said cells are arranged in a matrix comprising rows and columns, said first control line comprising a column line shared by the cells of two adjacent columns and said second and third control lines comprising a pair of row lines for a given one of said rows.

3. The memory of claim 2 in which said first control line is operatively connected to data means and address means, and said second and third control lines are connected to address means.

4. The memory of claim 1 in which said first control line is operatively connected to data means and address means, and said second and third control lines are connected to address means.

5. The memory of claim 1 wherein each of said cells comprises a flip-flop circuit having an input and an output, said conditional connecting means comprising a pair of switching devices, the output circuit of one of said devices being connected between the output of one of said cells and said first control line and the output circuit of said other device being connected between the input of said other cell and said first control line, the control terminals of each of said devices being operably connected to a different one of said second and third control lines.

6. The memory of claim 5 wherein said cells are arranged in a matrix comprising rows and columns, said first control line comprising a column line shared by the cells of two adjacent columns and said second and third control lines comprising a pair of row lines for a given one of said rows.

7. The memory of claim 5, further comprising a data input line and a data output line, each of said data input and data output lines being conditionally connected to said first control line.

8. The memory of claim 7 wherein said cells are arranged in a matrix comprising rows and columns, said first control line comprising a column line shared by the cells of two adjacent columns and said second and third control lines comprising a pair of row lines for a given one of said rows.

9. In the memory of claim 1, actuating means operatively connected to said second and third control lines and effective to actuate one or the other or neither, but not both, of said lines at any given moment.

10. The memory of claim 1 wherein said cells comprise a switching device and a storage node, each of said cells having the output circuit of the switching device thereof connected between said first control line and said storage node, said storage node of one of said cells being capacitively coupled to one of said second and third control lines and the control terminal of the device in said one cell connected to the other of said second and third control lines, said other cell having its storage node capacitively coupled to said other of said second and third control lines and the control terminal of the device in said other cell connected to said one of said second and third control lines.

11. The memory of claim 10 wherein said cells are arranged in a matrix comprising rows and columns, said first control line comprising a column line shared by the cells of two adjacent columns and said second and third control lines comprising a pair of row lines for a given one of said rows.

12. In the memory of claim 10, actuating means effective when one of said second and third control lines is actuated to render conductive the device whose control terminal is connected thereto and to deactuate the other of said second and third control lines, thereby to render nonconductive the device whose control terminal is connected thereto.

13. The memory of claim 12 wherein said cells are arranged in a matrix comprising rows and columns, said first control line comprising a column line shared by the cells of two adjacent columns and said second and third control lines comprising a pair of row lines for a given one of said rows.

14. The memory of claim 12, further comprising a data input line and a data output line, each of said data input and data output lines being conditionally connected to said first control line.

15. A random access memory having a plurality of memory cells arranged in a row-and-column matrix array, each of the cells comprising a flip-flop circuit with an input and an output and input and output switching devices, the output circuits of which are operably connected to the input and output of the cell respectively, said memory comprising a pair of command lines associated with each row of cells in said array and a single data flow line associated with each pair of adjacent columns of cells in said array, one of said command lines being connected to the control terminals of the input and output devices of each cell in an even column in the row associated therewith and said other command line being connected to the input and output devices of each cell in an odd column in the row associated therewith, each of said data flow lines being connected between the output device of the cells in one column and the input devices of the cells in the adjacent column.

16. The memory of claim 15, further comprising address selecting circuitry capable of actuating only one of said command lines in one row at a given instant such that the device whose control terminals are connected to said actuated command line are rendered conductive.

17. A random access memory having a plurality of memory cells arranged in a row-and-column matrix array, each of said cells comprising a single switching device and a storage node, said memory comprising a first and a second command line associated with each row of cells in said array and a single data flow line associated with each pair of adjacent columns of cells in said array, the output circuit of the switching device of each cell in each column being connected between the storage node of that cell and the data flow line associated with that column, the control terminal of the switching device of each cell in an even numbered column being connected to said first command line associated with the row in which the cell is situated and the control terminal of the switching device of each cell in an odd numbered column being connected to said second command line associated with the row in which the cell is situated.

18. The memory of claim 17 wherein the storage nodes of cells in the even numbered columns are capacitively coupled to said second command line associated with the cells in that row and the storage nodes of cells in the odd numbered columns are capacitively coupled to said first command line associated with the cells in that row.

19. The memory of claim 17 further comprising means for addressing a particular cell in said array, said means effective to actuate said first command line in the addressed row if the addressed cell is in an even numbered column and said second command line if the addressed cell is in an odd numbered column.

20. The memory of claim 19 wherein the nonactuated command line in the addressed row is maintained at a voltage level sufficient to render nonconductive the devices whose control terminals are connected therewith.

21. The memory of claim 17 further comprising a plurality of refresh amplifiers each of which is operably connected to a different one of said data flow lines.

22. The memory of claim 21 further comprising input and output lines, said output line being conditionally connected to each of said data flow lines and said input line being conditionally connected to each of said amplifiers.

* * * * *